US008606186B2

(12) United States Patent
Aithal et al.

(10) Patent No.: US 8,606,186 B2
(45) Date of Patent: Dec. 10, 2013

(54) WIRELESS COMMUNICATION PATH MANAGEMENT METHODS AND SYSTEMS

(75) Inventors: Prakasha Aithal, Kanata (CA); Justin L. Wintour, Ottawa (CA)

(73) Assignee: Dragonwave, Inc., Kanata, Ontario (CA)

( * ) Notice: Subject to any disclaimer, the term of this patent is extended or adjusted under 35 U.S.C. 154(b) by 917 days.

(21) Appl. No.: 11/793,680

(22) PCT Filed: Dec. 15, 2005

(86) PCT No.: PCT/CA2005/001895
§ 371 (c)(1),
(2), (4) Date: Aug. 18, 2008

(87) PCT Pub. No.: WO2006/066396
PCT Pub. Date: Jun. 29, 2006

(65) Prior Publication Data
US 2008/0305743 A1  Dec. 11, 2008

Related U.S. Application Data

(60) Provisional application No. 60/637,773, filed on Dec. 22, 2004.

(51) Int. Cl.
*H04B 17/00* (2006.01)
(52) U.S. Cl.
USPC ............... 455/67.11; 455/406; 455/414.3; 455/419
(58) Field of Classification Search
USPC ..................................... 455/67.11
See application file for complete search history.

(56) References Cited

U.S. PATENT DOCUMENTS

| 5,425,076 | A | 6/1995 | Knippelmier |
| 5,815,561 | A * | 9/1998 | Nguyen et al. ........... 379/115.01 |
| 6,018,655 | A | 1/2000 | Bartle et al. |
| 6,208,627 | B1 | 3/2001 | Menon et al. |
| 6,721,572 | B1 | 4/2004 | Smith et al. |
| 6,751,205 | B2 | 6/2004 | Menon et al. |
| 2003/0097610 | A1* | 5/2003 | Hofner .......................... 714/10 |
| 2003/0157925 | A1* | 8/2003 | Sorber et al. ................. 455/406 |
| 2006/0025122 | A1* | 2/2006 | Harris et al. ................. 455/419 |
| 2011/0050410 | A1* | 3/2011 | Rezvani et al. ............... 340/506 |

FOREIGN PATENT DOCUMENTS

EP  1424817 A2  6/2004

OTHER PUBLICATIONS

Extended European Search Report for Application No. EP 05 80 4977.6, dated Jun. 16, 2011 (9 pages).
International Search Report based on International PCT Application No. PCT/CA2005/001895.
International Preliminary Report on Patentability based on International PCT Application No. PCT/CA2005/001895.

* cited by examiner

*Primary Examiner* — Ajibola Akinyemi

(57) ABSTRACT

Methods and systems for managing wireless communication paths are provided. At wireless communication equipment which is connected to a communication device, a wireless communication path to a remote communication device is monitored. Based on results of the monitoring, a determination is made as to whether the wireless communication path should be shut down. If it is determined that the wireless communication path should be shut down, a respective notification is provided to each of the communication devices. A notification may also be provided from wireless communication equipment to a communication device to which it is operatively coupled responsive to receiving a notification that remote wireless communication equipment has determined that the wireless communication path should be shut down. In some embodiments, these notifications are used to present various modes of failure in a wireless communication path to the path endpoints as a physical layer failure.

42 Claims, 5 Drawing Sheets

WIRELESS COMMUNICATION PATH MANAGEMENT METHODS AND SYSTEMS

CROSS-REFERENCE TO RELATED APPLICATIONS

This application claims the benefit of U.S. Provisional Pat. App. Ser. No. 60/637,773, filed on Dec. 22, 2004.

This application also claims the benefit of, and is a National Phase entry of, PCT Application Serial No. PCT/CA2005/001895, filed on Dec. 15, 2005, which in turn claims the benefit of the above Provisional Patent Application.

The entire contents of these related patent applications are incorporated in their entirety herein by reference.

FIELD OF THE INVENTION

This invention relates generally to wireless communications and, in particular, to managing wireless communication paths.

BACKGROUND

In Ethernet networks, several techniques are known for providing network resiliency and self healing functions. These techniques mitigate the effects of communication link or communication equipment failures, and include, for example, Spanning Tree Protocol (STP), Rapid Spanning Tree Protocol (RSTP), Resilient Packet Ring (RPR), and Link Aggregation.

The above mechanisms are typically used by switching/routing nodes to constitute a data path from one user network to another user network based on user-supplied decision parameters. The switching/routing nodes forward traffic in a decided data path until that data path breaks down. When the data path breaks down, a data path is re-established so that user network connectivity is maintained except for the duration of data path re-establishment.

In a wired Ethernet mesh or ring network, the failure of the data path can be recognized by connected nodes either when a response to a transmission by resiliency protocols is not received from an adjacent node within a predetermined time or the nodes identify an explicit failure to receive signals at the physical layer. In a wired network, the second mode of failure results when a physical interface in one or both of the nodes fails or when the interconnecting communication medium, a wire in this case, breaks or disconnects from any node. This type of failure is generally referred to as a symmetrical failure in that adjacent nodes recognize the failure simultaneously and take action to switch traffic to an alternate path very quickly.

In a wireless Ethernet mesh or ring network, however, wireless links are used to interconnect adjacent nodes. A wireless link is different than a wired connection in that there are extra layers of connectivity between the nodes, in the form of radio and physical layers, at each end of the link. There are thus additional potential points of failure in a connection between nodes.

Some types of wireless communication path failures, failures in traffic transfer in only one direction on a wireless communication path due to fading for instance, might not be detected simultaneously in adjacent nodes. Although this type of asymmetrical failure might eventually be detected at both nodes by inherent resiliency protocols, the switchover of traffic to an alternate path, in other words the action by self healing resiliency measures or mechanisms in the nodes, becomes sluggish or very slow and results in data loss over a long period of time. This can also result in a period of time where in the network is in imbalance, causing traffic flooding which affects the performance of traffic in other paths which should not have been affected by failure of a particular path.

Therefore, there remains a need for wireless communication link management techniques which provide for more timely detection of faults or failures. There is also a need for techniques for triggering inherent resiliency mechanisms in switching/routing nodes to act very quickly in re-establishing a data path when a fault or failure has been detected.

SUMMARY OF THE INVENTION

Embodiments of the invention provide for notifications between Ethernet network elements whereby a determination at one network element that a wireless communication path should be shut down is communicated to an adjacent network element. Each network element can then take steps to shut down the path and preferably re-establish the path.

According to one aspect of the invention, there is provided a method of managing a wireless communication path. The method includes monitoring, at wireless communication equipment operatively coupled to a communication device, a wireless communication path established between the communication device and a remote communication device through the wireless communication equipment, determining whether the wireless communication path should be shut down based on results of the monitoring, and providing a respective notification to each of the communication devices where the wireless communication path should be shut down.

In some embodiments, monitoring involves monitoring at least one of: a communication link between the wireless communication equipment and the communication device, physical interfaces at each end of the communication link, and a wireless communication link between the wireless communication equipment and remote wireless communication equipment operatively coupled to the remote communication device.

Monitoring may also or instead involve monitoring at least one of: an error rate of communication signals received from remote wireless communication equipment operatively coupled to the remote communication device, an operating status of hardware at the wireless communication equipment, an operating status of hardware at the communication device, an operating status of software at the wireless communication equipment, an operating status of software at the communication device, user inputs received at the wireless communication equipment, user inputs received at the communication device, and an Arrivals State received from the remote wireless communication equipment indicating an operating status of receiving functions at the remote wireless communication equipment. The user inputs comprise at least one of: user inputs received from a network management system (NMS) for managing a communication network comprising the communication devices or for managing the wireless communication path, user inputs received from a local user interface at the wireless communication equipment, and user inputs received from a local user interface at the communication device.

The operation of determining may involve determining that the wireless communication path should be shut down where at least one of the following is detected:

an error rate of communication signals received from the remote wireless communication equipment within a predetermined period of time exceeds a threshold error rate;

a hardware failure at the wireless communication equipment or the communication device;

a software failure at the wireless communication equipment or the communication device;

a user input requesting that the wireless communication path be shut down; and the Arrivals State indicates that the receiving functions at the remote wireless communication equipment are not in a normal operating state.

In some embodiments, the operation of providing involves transmitting to the remote communication device state information associated with at least one of: the wireless communication path, the wireless communication equipment, and the communication device. The state information may include a Departures State representing the likelihood of communication traffic being correctly received at the remote wireless communication equipment.

According to another embodiment, providing comprises providing a notification to the remote communication device by transmitting a wireless communication path shutdown command to the remote communication device.

Information may be transmitted to the remote communication device via at least a portion of the wireless communication path or via an alternate communication path.

Where a notification is provided to the communication device by shutting down the wireless communication path at the wireless communication equipment, and transmitting may involve transmitting the information after shutting down the wireless communication path.

If it is determined that the wireless communication path should not be shut down, the method may also include an operation of periodically transmitting to the remote wireless communication equipment state information associated with at least one of: the wireless communication path, the wireless communication equipment, and the communication device.

The operations of monitoring, determining, and providing may be repeated for each of a plurality of respective wireless communication paths between the wireless communication equipment and a plurality of installations of remote wireless communication equipment.

As noted above, a notification may be provided to the communication device by shutting down the wireless communication at the wireless communication equipment. In this case, the method may also include, after shutting down the wireless communication path, monitoring, at the wireless communication equipment, at least one of the wireless communication path and one or more components associated with the wireless communication path, determining whether the wireless communication path should be re-established, and re-establishing the wireless communication path at the wireless communication equipment where the wireless communication path should be re-established.

The operations of monitoring the wireless communication path before and after shutdown may involve monitoring common conditions associated with the wireless communication path.

Even though common conditions may be monitored before and after shutdown, the operations of determining whether the wireless communication path should be shut down and determining whether the wireless communication path should be re-established may involve applying respective different criteria to the common conditions.

Determining whether the wireless communication path should be re-established may also or instead involve determining whether a command to re-establish the wireless communication path has been received at the wireless communication equipment or at the remote wireless communication equipment. Such a command may include at least one of: a command received from a network management system (NMS) for managing a communication network comprising the communication devices or for managing the wireless communication path and a command received from a local user interface at the wireless communication equipment or the communication device.

In some embodiments, the method also involves receiving a notification from the wireless communication equipment at the remote wireless communication equipment, and shutting down the wireless communication path at the remote wireless communication equipment responsive to the received notification.

The wireless communication path may also be monitored at the remote wireless communication equipment, and in this case the method may involve determining, at the remote wireless communication equipment, whether the wireless communication path should be shut down based on results of the monitoring, and providing a respective notification from the remote wireless communication equipment to each of the communication devices where it is determined at the remote wireless communication equipment that the wireless communication path should be shut down.

The communication devices may be network elements in an Ethernet network, for example.

There is also provided a system for managing a wireless communication path. The system includes a wireless communication path monitor configured to monitor at wireless communication equipment operatively coupled to a communication device a wireless communication path established between the communication device and a remote communication device through the wireless communication equipment, and a wireless communication path control module operatively coupled to the wireless communication path monitor and configured to determine based on monitoring results whether the wireless communication path should be shut down, and to provide a respective notification to each of the communication devices where the wireless communication path should be shut down. At least one of the wireless communication path monitor and the wireless communication path control module may be implemented in a processor.

If the wireless communication path comprises a communication link between the wireless communication equipment and the communication device and a physical interface at each end of the communication link, the wireless communication path monitor may be configured to monitor at least one of: the wired communication link, the physical interfaces, and a wireless communication link between the wireless communication equipment and remote wireless communication equipment operatively coupled to the remote communication device.

In some embodiments, the wireless communication path monitor is configured to monitor at least one of: an operating status of hardware at the wireless communication equipment, an operating status of hardware at the communication device, an operating status of software at the wireless communication equipment, an operating status of software at the communication device, user inputs received at the wireless communication equipment, and user inputs received at the communication device.

At least one of the wireless communication equipment and the communication device further comprises a user input device for receiving the user inputs.

The wireless communication equipment and/or the communication device may further include an interface configured to receive user inputs from a network management system (NMS) for managing a communication network comprising the communication devices or for managing the wireless communication path.

A receiver may be provided in the wireless communication equipment for receiving communication signals from remote wireless communication equipment operatively coupled to the remote communication device. The wireless communication path monitor may then be configured to monitor at least one of: an error rate of the received communication signals and an Arrivals State received from the remote wireless communication equipment indicating an operating status of receiving functions at the remote wireless communication equipment, and to determine that the wireless communication path should be shut down responsive to detecting that the error rate within a predetermined period of time exceeds a threshold error rate or the Arrivals State indicates that the receiving functions at the remote wireless communication equipment are not in a normal operating state.

As described briefly above in the context of a method, the wireless communication path monitor may be configured to determine that the wireless communication path should be shut down responsive to detection of at least one the following conditions:

a hardware failure at the wireless communication equipment or the communication device;

a software failure at the wireless communication equipment or the communication device; and a user input requesting that the wireless communication path be shut down.

The wireless communication equipment may include a transmitter for transmitting communication signals to remote wireless communication equipment operatively coupled to the remote communication device, in which case the wireless communication path monitor may provide a notification to the remote communication device by transmitting through the transmitter a wireless communication path shutdown command or state information associated with at least one of the wireless communication path, the wireless communication equipment, and the communication device. The state information may include a Departures State representing the likelihood of communication traffic being correctly received at the remote wireless communication equipment.

In some embodiments, the wireless communication equipment incorporates a transmitter for enabling communication, via an alternate communication path, with remote wireless communication equipment operatively coupled to the remote communication device, and the wireless communication path monitor is configured to provide a notification to the remote communication device by transmitting information to the remote wireless communication equipment through the transmitter.

If the wireless communication equipment includes a transmitter for transmitting communication signals to remote wireless communication equipment operatively coupled to the remote communication device, the wireless communication path monitor may periodically transmit to the remote wireless communication equipment through the transmitter state information associated with at least one of the wireless communication path, the wireless communication equipment, and the communication device where the wireless communication path should not be shut down. The state information may include the Arrivals State indicating an operating status of receiving functions at the wireless communication equipment.

It will be apparent from the foregoing that the wireless communication path control module may be configured to provide a notification to the communication device by one or more of: transmitting a notification message to the communication device, and shutting down the wireless communication path at the wireless communication equipment.

The wireless communication equipment may be configured to exchange communication signals with multiple installations of remote wireless communication equipment via respective wireless communication paths. In this case, the wireless communication path monitor may be configured to monitor each of the plurality of wireless communication paths, and wherein the wireless communication path control module is configured to provide notifications to communication devices associated with wireless communication paths which the wireless communication path control module determines should be shut down.

The wireless communication path control module may provide a notification to the communication device by shutting down the wireless communication path at the wireless communication equipment. The wireless communication path monitor may monitor, after the wireless communication path is shut down, at least one of the wireless communication path and one or more components at the wireless communication equipment which are associated with the wireless communication path, and be further configured to determine whether the wireless communication path should be re-established and to re-establish the wireless communication path at the wireless communication equipment where the wireless communication path should be re-established.

The determinations as to whether the wireless communication path should be shut down and whether the wireless communication path should be re-established may be based on common monitored conditions of the wireless communication path and the one or more components associated with the wireless communication path. In making these determinations, the wireless communication path control module may apply respective different criteria to the common conditions to determine whether the wireless communication path should be shut down and to determine whether the wireless communication path should be re-established.

In some embodiments, the wireless communication equipment further includes at least one of: an interface for receiving from a network management system (NMS) for managing a communication network comprising the communication devices or for managing the wireless communication path a command to re-establish the wireless communication path and a local user interface for receiving the command as a user input. The wireless communication path control module may then determine whether the wireless communication path should be re-established by determining whether the command has been received at the wireless communication equipment.

The wireless communication equipment may also include a receiver for receiving communication signals from remote wireless communication equipment operatively coupled to the remote communication device, and in this case the wireless communication path control module may determine that the wireless communication path should be shut down at the wireless communication equipment where a notification that the wireless communication path should be shut down is received from the remote wireless communication equipment.

According to one possible implementation, a network includes a network element operatively coupled to a wireless communication network element incorporating a system as described briefly above, and a remote network element operatively coupled to a remote wireless communication network element. The remote wireless communication network element includes a receiver for receiving a notification from the wireless communication network element, and a wireless communication path control module configured to provide a path shutdown notification to the remote network element responsive to the received notification.

Another network implementation includes a plurality of network elements connected to respective wireless communication network elements incorporating the system described briefly above. The wireless communication network elements comprise respective wireless communication paths between the network elements, and the wireless communication path control module at each wireless communication network element comprising a wireless communication path is configured to provide a path shutdown notification to its associated network element responsive to either its own determination that the wireless communication path should be shut down or a notification from the other wireless communication network element comprising the wireless communication path.

Another aspect of the invention provides a method of managing a wireless communication path that includes receiving at wireless communication equipment operatively coupled to a communication device a notification that a determination has been made at remote wireless communication equipment operatively coupled to a remote communication device that a wireless communication path between the communication devices should be shut down, and providing a path shutdown notification to the communication device responsive to the received notification.

The received notification may include state information associated with at least one of: the wireless communication path, the remote wireless communication equipment, and the remote communication device. The state information, as noted above, may include a Departures State representing the likelihood of communication traffic being correctly received at the wireless communication equipment.

The notification may also or instead include a wireless communication path shutdown command.

Receiving may involve receiving the notification via at least a portion of the wireless communication path.

The operation of providing a path shutdown notification may involve shutting down the wireless communication path at the wireless communication equipment. In this case, the method may also involve, after shutting down the wireless communication path, monitoring, at the wireless communication equipment, at least one of the wireless communication path and one or more components associated with the wireless communication path, determining whether the wireless communication path should be re-established, and re-establishing the wireless communication path at the wireless communication equipment where the wireless communication path should be re-established.

Monitoring at the wireless communication equipment and monitoring at the remote wireless communication equipment may involve monitoring common conditions associated with the wireless communication path.

The operations of determining whether the wireless communication path should be shut down and determining whether the wireless communication path should be re-established may involve applying respective different criteria to the common conditions.

The communication path re-establishment determination may be made based on whether a command to re-establish the wireless communication path has been received at the wireless communication equipment or the remote wireless communication equipment.

If the operation of providing a path shutdown notification involves shutting down the wireless communication path at the wireless communication equipment, the method may also include an operation of shutting down the wireless communication path at the remote wireless communication equipment.

A system for managing a wireless communication path, according to another aspect of the invention, includes a wireless communication path monitor configured to receive at wireless communication equipment operatively coupled to a communication device a notification that a determination has been made at remote wireless communication equipment operatively coupled to a remote communication device that a wireless communication path between the communication devices should be shut down, and a wireless communication path control module operatively coupled to the wireless communication path monitor and configured to provide a path shutdown notification to the communication device responsive to the received notification.

At least one of the wireless communication path monitor and the wireless communication path control module may be implemented in a processor.

The received notification may includes a wireless communication path shutdown command or state information associated with at least one of the wireless communication path, the remote wireless communication equipment, and the remote communication device. The state information may include a Departures State representing the likelihood of communication traffic being correctly received at the wireless communication equipment.

In some embodiments, the wireless communication path monitor is operatively coupled to a transceiver for enabling communication with the remote wireless communication equipment via the wireless communication path, and is configured to receive the notification through the transceiver.

The wireless communication path control module may be configured to provide the shutdown notification to the communication device by shutting down the wireless communication path at the wireless communication equipment, in which case the wireless communication path monitor may be further configured to monitor, after shutting down the wireless communication path, at least one of the wireless communication path and one or more components at the wireless communication equipment which are associated with the wireless communication path, to determine whether the wireless communication path should be re-established and to re-establish the wireless communication path at the wireless communication equipment where the wireless communication path should be re-established.

As noted above, the wireless communication path monitor and a remote wireless communication path monitor at the remote wireless communication equipment may be configured to monitor common conditions associated with the wireless communication path.

A remote wireless communication path control module at the remote wireless communication equipment may be configured to determine that the wireless communication path should be shut down by applying criteria to the common conditions, whereas the wireless communication path control module is configured to apply different criteria to the common conditions to determine whether the wireless communication path should be re-established.

The wireless communication equipment may include at least one of: an interface for receiving from a network management system (NMS) a command to re-establish the wireless communication path and a local user interface for receiving the command as a user input. The wireless communication path monitor may then determine whether the wireless communication path should be re-established by determining whether the command has been received at the wireless communication equipment.

A communication network may include a network element connected to a wireless communication network element incorporating a system for managing a wireless communication path, and a remote network element connected to a remote wireless communication network element. The remote wireless communication network element includes a wireless communication path control module configured to send the notification to the wireless communication network element.

According to another possible communication network implementation, a plurality of network elements are connected to respective wireless communication network elements that incorporate a system for managing a wireless communication path. The wireless communication network elements comprising respective wireless communication paths between the network elements, and the wireless communication path control module at each wireless communication network element comprising a wireless communication path is configured to provide a path shutdown notification to its associated network element responsive to either its own determination that the wireless communication path should be shut down or a notification from the other wireless communication network element comprising the wireless communication path.

In a communication system in which communication networks are interconnected by wireless communication paths comprising respective wireless communication network elements connected to network elements of the communication networks, a method of managing the wireless communication paths may include monitoring, at each wireless communication network element, each wireless communication path via which the wireless communication network element communicates with a respective adjacent wireless communication network element, to detect any of multiple modes of failure in each wireless communication path, and presenting any modes of failure detected by a wireless communication network element for a wireless communication path to the network element to which the wireless communication network element is connected as a physical layer failure.

Other aspects and features of embodiments of the present invention will become apparent to those ordinarily skilled in the art upon review of the following description of specific illustrative embodiments of the invention.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
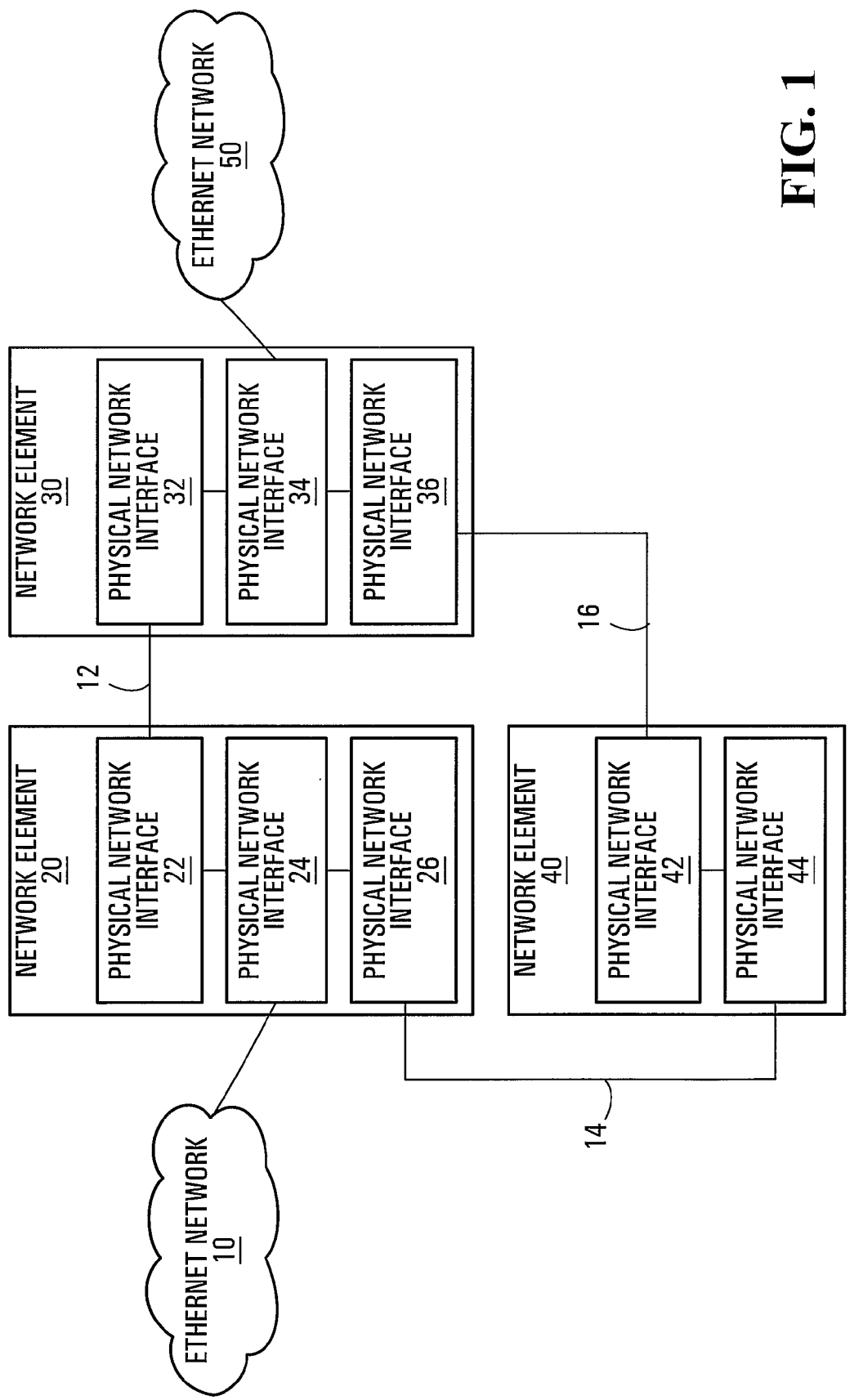
FIG. 1 is a block diagram of a wired Ethernet mesh/ring network.

FIG. 1 is a block diagram of a wired Ethernet mesh/ring network. In FIG. 1, Ethernet networks 10, 50 are interconnected by network elements 20, 30, 40 and wired connections 12, 14, 16. Each network element 20, 30, 40 includes physical network interfaces 22/24/26, 32/34/36, 42/44. Those skilled in the art to which this application pertains will be familiar with the structure and operation of systems of the type shown in FIG. 1, which is therefore discussed only briefly herein.

As described briefly above, a failure in a wired connection 12, 14, 16 can usually be detected substantially simultaneously by the network elements 20, 30, 40 connected by that connection. The network elements 20, 30, 40 can then take steps to quickly re-establish communications on the connection 12, 14, 16, which limits the amount of communication traffic which is lost when the connection 12, 14, 16 fails. STP, RSTP, RPR, and link aggregation represent examples of known mechanisms which may be used to establish and re-establish data paths on the connections 12, 14, 16.

The above mechanisms, although efficient when used in conjunction with wired connections, do not perform as well when network elements communicate via wireless communication paths. This will become further apparent from the following description of FIG. 2, which is a block diagram of a wireless communication path between network elements in an Ethernet mesh/ring network.

Figure 2:
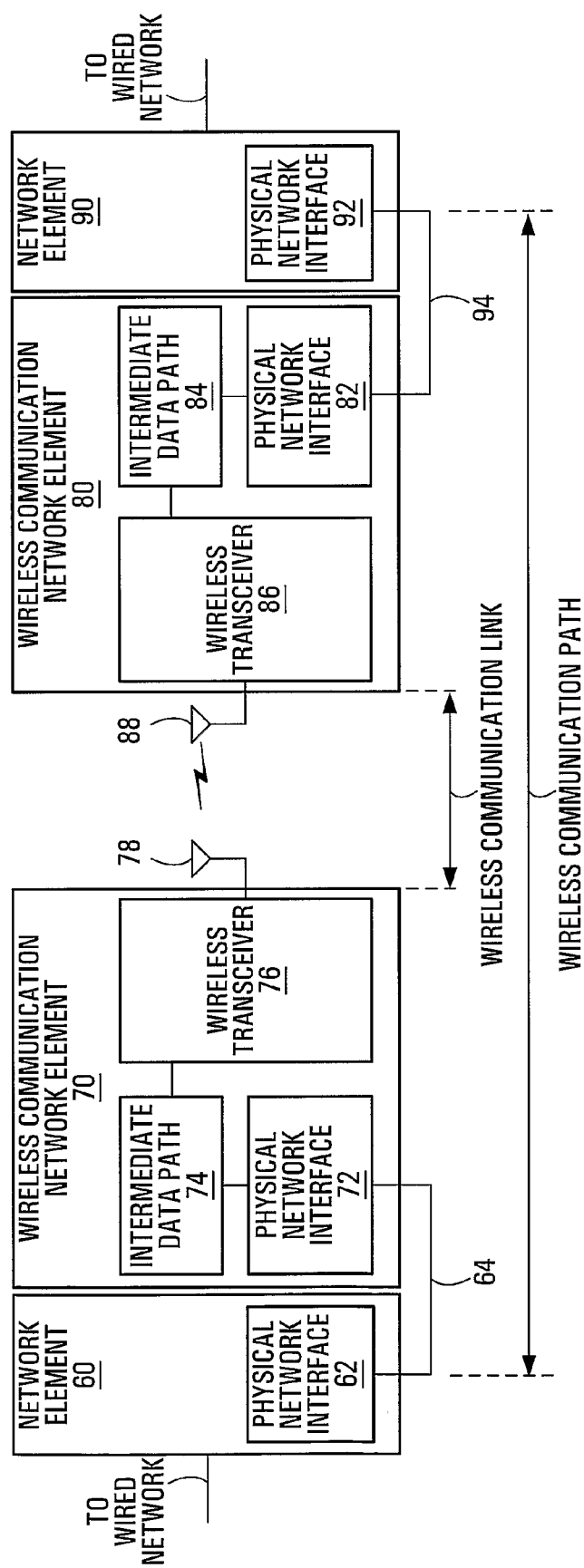
FIG. 2 is a block diagram of a wireless communication path between network elements in an Ethernet mesh/ring network.

FIG. 2 shows network elements 60, 90 which are connected to wired networks and also include respective physical interfaces 62, 92 to wireless communication network elements 70, 80. The wireless communication network elements 70, 80 provide for wireless communications between the wired networks to which the network elements 60, 90 are connected.

Each of the wireless communication network elements 70, 80 includes a physical network interface 72, 82 which is connected to the physical network interface 62, 92 of one of the network elements 60, 90 by a connection 64, 94. The connections 64, 94 may be wireless or wired connections. Similarly, other interconnections shown in the drawings and described herein may be made through wired connections, wireless connections, or some combination of both connection types. References to connections or operative couplings should be interpreted accordingly.

Although the proximity of the network elements 60, 90 to the wireless communication network elements 70, 80 may imply that the connections 64, 94 are local connections, this is not necessarily the case in all embodiments of the invention. In one embodiment, the techniques disclosed herein are applied at a wireless relay node in a wireless communication path, in which the failure of a link or connection on one side of the relay node would be communicated to other relay or endpoint nodes in the same path. Thus, either or both of the network elements 60, 90 may be wireless communication network elements and need not be operatively coupled to wired networks as shown.

It should also be appreciated that the division of wired and wireless communication functionality as shown in FIG. 2 is illustrative, and does not limit the scope of the invention. A single node or network element may incorporate interfaces and other components that support communications in both wired and wireless networks, for example. Therefore, more generally, embodiments of the invention may be implemented to manage wireless communication paths established between communication devices such as the network elements 60, 90 through respective installations of wireless communication equipment, namely the wireless communication network elements 70, 80.

An intermediate data path 74, 84 is also provided in each wireless communication network element 70, 80. The intermediate data paths 74, 84 may include hardware and/or software components which perform data conversions to convert between different data formats or protocols used in a wireless communication network and the wired networks to which the network elements 60, 90 are connected, for example, as well as other functions to support interoperation between the wired networks and wireless communication networks.

The wireless transceivers 76, 86 may provide such functions as coding, modulation, frequency conversion, and amplification of communication signals which have been received or are to be transmitted via the wireless communication link between the wireless communication network elements 70, 80. These communication signals are converted between electrical and electromagnetic signals by the antennas 78, 88 or a combination of the wireless transceivers and antennas 76/78, 86/88.

Many different types of wired and wireless communication links and networks will be apparent to those skilled in the art. It will also be apparent that the particular structure and function of the network elements 60, 90 and the wireless communication network elements 70, 80, may vary with different types of wired and wireless communication networks. Embodiments of the present invention are in no way restricted to any particular type of wired or wireless communication network.

As shown in FIG. 2, the network elements 60, 90 are interconnected by a wireless communication path. The wireless communication path includes not only a wireless link between the wireless communication network elements 70, 80, but also wireless communication components such as the antennas 78, 88 and the wireless transceivers 76, 86, other components represented by the intermediate data paths 74, 84, the connections 64, 94 between the wireless communication network elements 70, 80 and the network elements 60, 90, and the interfaces 62, 92 to the connections 64, 94. Thus, it will be apparent that a wireless communication path may include both wired and wireless portions. It should also be appreciated that the techniques disclosed herein may be applied at virtually any point in a wireless communication path, including wired to wireless transition nodes. Where the connections 64, 94 are wired connections, the wireless communication network elements 70, 80 represent such wired to wireless transition nodes.

Wireless communication paths are different than wired connections used in conventional Ethernet mesh/ring networks in that there are extra layers of connectivity between the nodes in the form of a radio layer, represented in FIG. 2 by the wireless transceivers 76, 86, and a physical (PHY) layer at each end of the link, represented by the interfaces 72, 82.

In a wireless Ethernet mesh/ring network, there are thus additional different points of failure in the wireless communication path between adjacent network elements, illustratively switching/routing nodes. These points of failure include, for example:

either or both of the wired connections 64, 94 between the network elements 60, 90 and the wireless communication network elements 70, 80, which may fail or be pulled out for instance;

the physical network interfaces 62, 72, 82, 92, any of which may fail;

the wireless transceivers 76, 86, which may fail because of fading or failure of hardware and/or software in either or both of the wireless communication network elements 70, 80; and disconnection of the wireless communication path, which may be induced intentionally or unintentionally at virtually any point in the wireless communication path.

Unless a mechanism is implemented in the wireless communication path to symmetrically present, to the network elements 60, 90, a disconnection or failure in any form anywhere in the data path between the network elements 60, 90, a switchover of communication traffic to an alternate path becomes sluggish, which results in data loss over a longer period of time relative to a wired Ethernet mesh/ring network. As noted above, this can also result in a period of time in which the network is in imbalance, causing traffic flooding affecting the flow of communication traffic in other data paths which should not have been affected by failures in a particular data path.

Figure 3:
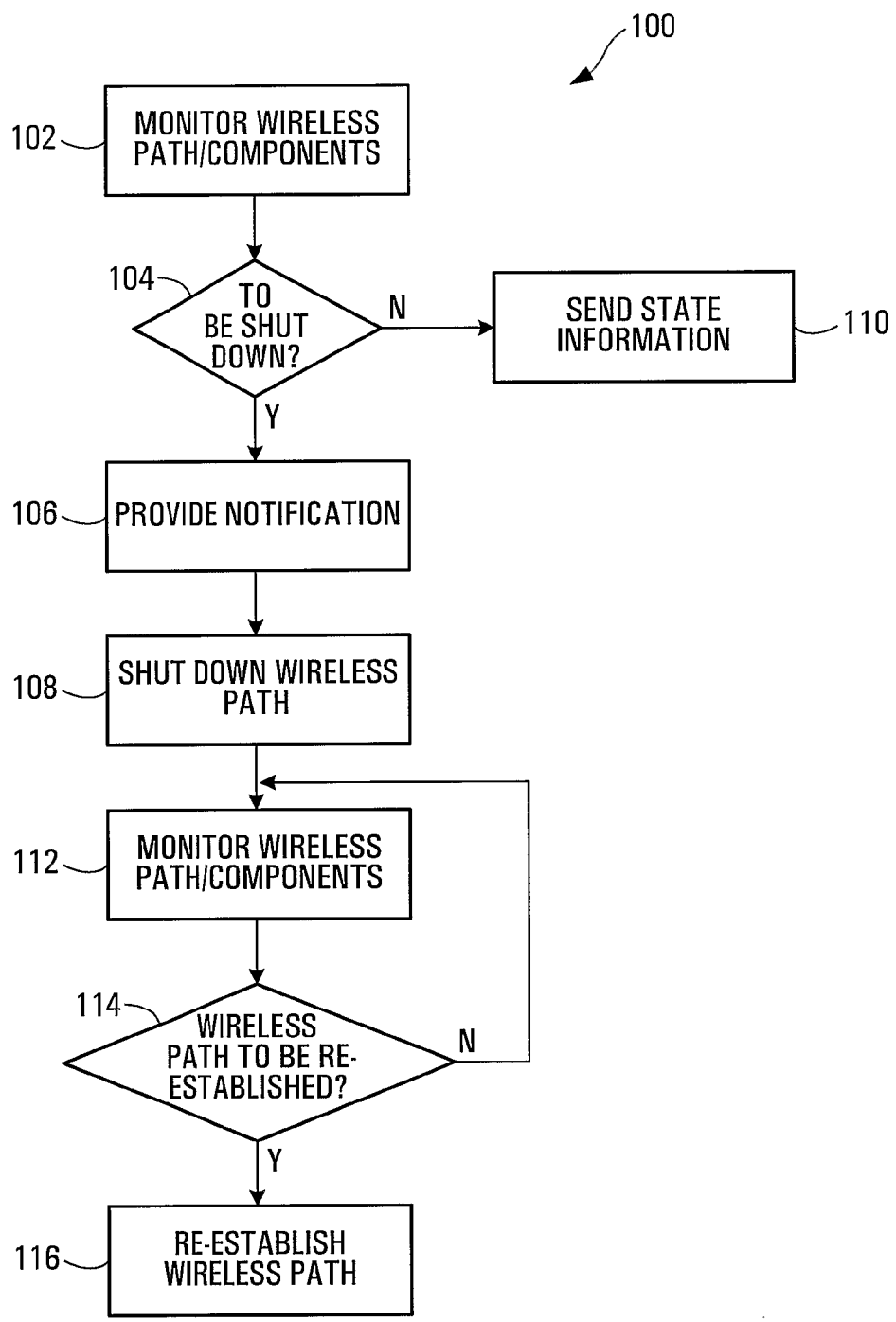
FIG. 3 is a flow diagram of a method according to an embodiment of the invention.

FIG. 3 is a flow diagram of a method according to an embodiment of the invention, in which wireless communication equipment such as a network element of a wireless communication network notifies communication devices, illustratively Ethernet nodes or possibly other wireless communication devices, that communicate via a wireless communication path, when it makes a determination that the wireless communication path should be shut down.

The method 100 of FIG. 3 begins at 102 with an operation of monitoring, at wireless communication equipment, a wireless communication path used for communications with a remote wireless communication network element. The monitoring operation may involve monitoring a communication link such as the link 64, 94 (FIG. 2) between a wireless communication network element and wired communication components at a network element to which it is connected, physical interfaces such as 62, 72 or 82, 92 (FIG. 2) at either or both ends of the communication link, and an actual wireless communication link between the wireless communication equipment and the remote wireless communication equipment.

Other components, portions, or conditions associated with a wireless communication path may also or instead be monitored. For example, any of an error rate of communication signals received from remote wireless communication equipment, an operating status of hardware at the wireless communication equipment or the communication device to which it is connected, an operating status of software at the wireless communication equipment or the communication device to which it is connected, and user inputs received at the wireless communication component or the communication device to which it is connected could be monitored. User inputs may be received through a local user interface or input device at the wireless communication equipment or the communication device to which it is connected or an interface to a remote system such as a network management system (NMS) which is used to manage a communication network such as an Ethernet network and/or interconnections between such networks.

The method proceeds at 104 with an operation of determining whether the wireless communication path should be shut down based on results of the monitoring. This determination may be made by applying one or more criteria to monitored conditions. For example, it may be determined that the wireless communication path should be shut down when the error rate of communication signals received from the remote wireless communication equipment within a predetermined threshold time exceeds a threshold error rate, a hardware or software failure at the wireless communication equipment or the communication device to which it is connected is detected, or a user input requesting that the wireless communication path be shut down is received. Additional or alternative criteria for determining whether the wireless communication path should be shut down have been described above, and may be apparent to those skilled in the art. The present invention is in no way limited to any particular conditions or criteria upon the basis of which the determination at 104 is made.

The operations at 102 and 104 may also or instead involve "predictive" monitoring of a communication path. For example, with reference to FIG. 2, an output and/or an input of the wireless transceiver 76 might be monitored for errors. Where the transceiver 76 processes an error correction code or has some other type of error correction capability, however, the number of errors corrected could also be important for wireless communication path monitoring. In this case, it may be desirable to shut down one path and establish a different path when the number of errors corrected approaches an error correction limit of coding used by the transceiver 76. This allows action to be taken before problem conditions cause a breakdown of a data path, illustratively before the conditions result in actual data loss.

The above error correction example illustrates several features which may be provided in embodiments of the invention. In particular, any of various portions of a wireless communication path, and not just a wireless link portion of such a path, may be monitored. Path monitoring may also involve observing actual conditions and/or predicting future problem conditions.

If it is determined at 104 that the wireless communication path should be shut down, then the method proceeds at 106 with providing a respective notification of the determination from the wireless communication equipment to the communication devices connected by the wireless communication path. For a remote communication device at the far end of a wireless communication link, the operation at 106 may involve, for example, transmitting state information associated with any or all of the wireless communication path, the wireless communication equipment, and the communication device to the remote communication device, or to remote wireless communication equipment operatively coupled to the remote communication device. From the state information, the remote communication device or the remote wireless communication equipment can determine whether the wireless communication equipment has decided that the wireless communication link should be shut down. In one embodiment, state information includes an indication of a wireless communication equipment's readiness to receive payload traffic from remote wireless communication equipment, based on its decision as to whether the wireless communication path should be shut down. If wireless communication equipment determines that the wireless communication path should be shut down, then it transmits a "not ready to receive" state to the remote wireless communication equipment.

The notification provided at 106 may also or instead include an explicit wireless communication path shutdown command. Other suitable forms of state information and notifications may be apparent to those skilled in the art.

Information which is transmitted to provide the notification at 106 may be transmitted on the wireless communication path itself, by inserting information into communication traffic which is being transmitted on the path for instance, or on an alternate communication path, such as a network control or management channel.

Where a negative determination is made at 104, state information, or possibly other information, may optionally be sent to the remote wireless communication equipment or device at 110. This information may be transmitted periodically between wireless communication equipment to enable each installation of wireless communication equipment to monitor the wireless communication path, for example. Although not explicitly shown in FIG. 3, the method may then revert back to 102.

With reference now to 108, a positive determination at 104 may also trigger wireless communication path shutdown. Shutdown of the wireless communication path at 108 is one example of a notification that may be provided from wireless communication equipment to its connected communication device. This may involve, for example, disconnecting or otherwise disabling a physical interface in the wireless communication path. In FIG. 2 for instance, disabling the interface 72 effectively presents a determined fault or failure in the wireless communication path to the network element 60. The network element 60 would normally be able to detect that a physical interface has been disabled and begin data path recovery operations responsive thereto. Where the operation of providing a notification at 106 involves transmitting information on the wireless communication path, then the notification is preferably provided before the path is shut down at 108. Otherwise, the wireless communication path may be shut down before the notification is provided.

In some embodiments, a communication device may be operative to detect other types of notifications, such as control messages transmitted from wireless communication equipment for example. It should therefore be appreciated that shutdown of a communication path is one approach, but not the only possible approach, for providing a wireless communication path shutdown notification to a communication device.

Depending upon the form of the notification provided to a remote communication device and the components responsible for providing the notification, it may be possible to provide the notification after wireless communication equipment initiates path shutdown operations. For example, where the wireless communication path is shut down by disabling a physical interface 72, 82 (FIG. 2), it may still be possible to transmit information over the wireless link between the wireless communication network elements 70, 80.

Data path recovery operations are illustrated in FIG. 3 beginning at 112. After shutting down the wireless communication path at 108, the wireless communication path, if possible, and/or one or more components associated with the wireless communication path are monitored at 112. The monitoring operations performed at 112 may include virtually any of the monitoring operations performed at 102. The monitoring operations at 102 and 112 have been shown separately in FIG. 3 primarily because the wireless communication link between wireless communication equipment might not exist at 112. However, at least components at wireless communication equipment may be monitored at 112. In some cases, even though the wireless communication path has been shut down to payload traffic, wireless communication equipment may still be in communication over a wireless communication link as noted above, to exchange non-payload traffic such as state information or notifications for instance. In addition, most wireless communication networks provide control signalling for use in detecting communication network availability. Therefore, some form of wireless link monitoring at 112 may also be possible. References herein to monitoring of a wireless communication path and wireless communication path components should be interpreted accordingly.

At 112, a determination is made as to whether the wireless communication path should be re-established. Substantially the same criteria as used at 104 may be used in the determination at 114. In some embodiments, different criteria are applied to monitored conditions at 104 and 114. These criteria may be pre-established or user selected, or include some combination of both types of criteria. Different criteria for wireless communication path re-establishment may be useful to prevent repeated path shut down and re-establishment in marginal fading conditions, for example. In order to provide for greater user control of wireless communication path re-establishment, the determination at 114 may be dependent upon whether an explicit command to re-establish the wireless communication path has been received at the wireless communication equipment or the communication device to which it is connected, from a local user interface or an interface to another system such as an NMS.

The wireless communication path/components may be monitored at 112 until conditions are suitable for re-establishment of the path. Once all path re-establishment conditions are met, which may include the receipt of an explicit user command and the absence of any of shutdown triggers for instance, the path is re-established at 116. Wireless communication path re-establishment operations at 116 may proceed substantially in accordance with known techniques, such as STP, RSTP, RPR, or link aggregation. In the above example of shutting down the wireless communication path by disabling a physical interface 72, 82 (FIG. 2), each interface is preferably enabled at 116. The network elements 60, 90 then detect that the interfaces have been enabled and initiate re-establishment of communications.

The above operations may be repeated for each of multiple respective wireless communication paths between wireless communication equipment and a number of installations of remote wireless communication equipment, such as in a point-to-multipoint system.

At remote wireless communication equipment, the notification provided at 106 is received, and a path shutdown notification is similarly provided to a remote communication device responsive to the received notification, by shutting down the wireless communication path at the remote wireless communication equipment and/or transmitting a notification message to the remote communication device. The remote wireless communication equipment may also perform the operations described above to make a determination as to whether the wireless communication path should be shut down. Thus, wireless communication equipment which enables communication via a wireless communication path may shut down the wireless communication path responsive to either a local or remote determination that the path should be shut down, and subsequently initiate operations to restore the path.

Figure 4:
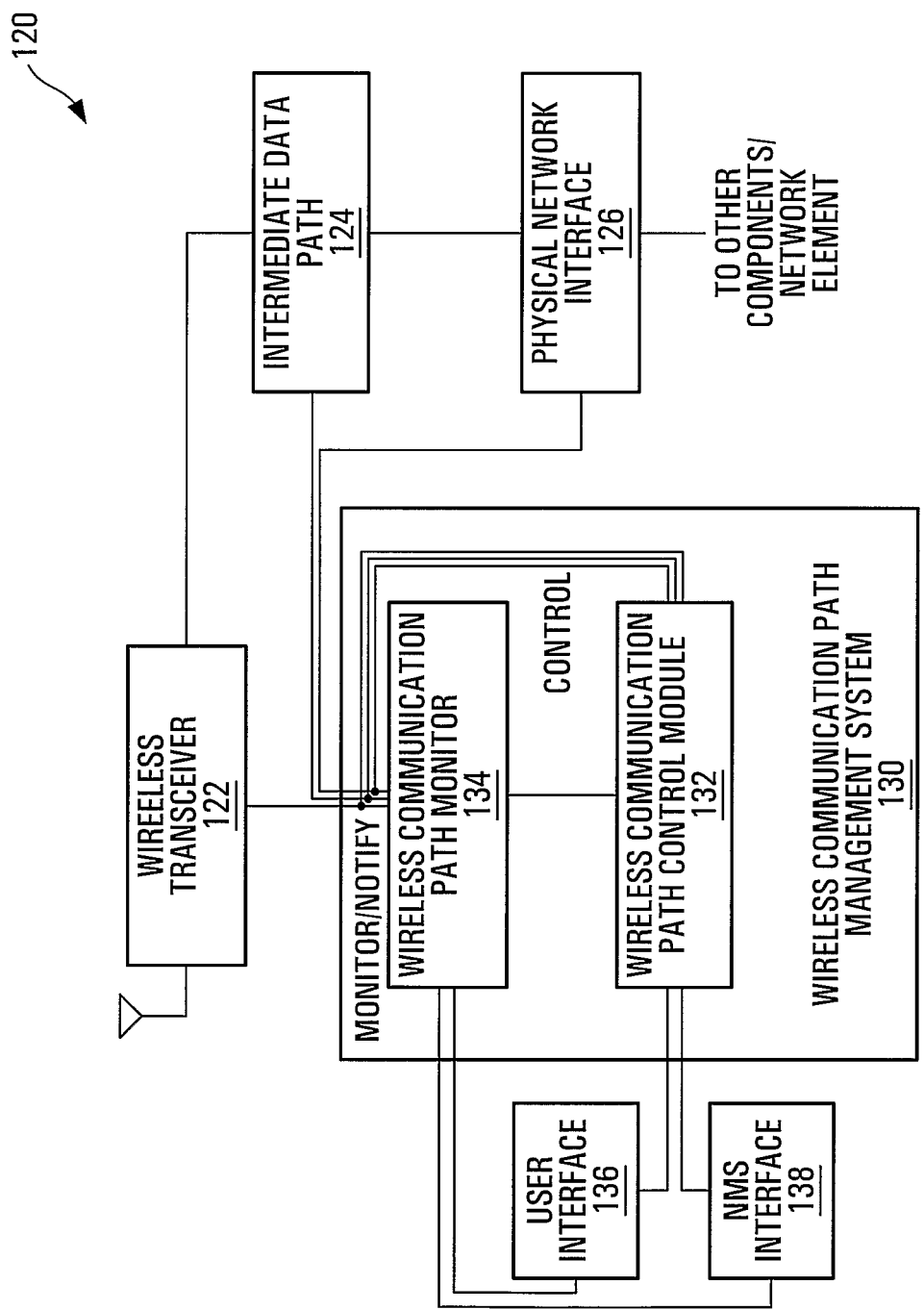
FIG. 4 is a block diagram of a system according to an embodiment of the invention.

Various embodiments of the invention have been described above in the context of a method. In terms of apparatus, FIG. 4 is a block diagram of a system according to an embodiment of the invention. Wireless communication path management functions as disclosed herein are provided by the wireless communication path management system 130, which is connected to a wireless transceiver 122, an intermediate data path 124, and a physical network interface 126. The latter components 122, 124, 126 may be substantially similar to similarly-labelled components shown in FIG. 2 and described above, and may be incorporated into a communication device or wireless communication equipment which is connected to the communication device to thereby enable the communication device for wireless communications with other communication devices. The user interface 136, which may be associated with an input device such as a mouse or a keyboard, and the NMS interface 138 are also connected to the wireless communication path management system 130. Although the user interface 136 and the NMS interface 138 would normally be existing interfaces in a communication device, these interfaces may instead be provided as part of the wireless communication path management system 130.

The wireless communication path management system 130 includes a wireless communication path monitor 134 and a wireless communication path control module 132, either or both of which may be implemented as hardware, software, or some combination thereof. In some embodiments, the wireless communication path monitor 134 and the wireless communication path control module 132 are implemented using a processor, such as a microprocessor or Application-Specific Integrated Circuit (ASIC), which is configured to perform various operations disclosed herein by executing software stored in a memory (not shown). A processor used to implement the components of the wireless communication path management system 130 may be a dedicated processor or a shared processor which executes other software to perform additional functions. In some embodiments, a combination of hardware components, illustratively a microprocessor and an ASIC, is used to implement the wireless communication path monitor 134 and/or the wireless communication path control module 132.

The wireless communication path monitor 134 is configured to monitor a wireless communication path. The wireless communication path control module 132 is configured to determine whether the wireless communication path should be shut down, and to provide a respective notification of the determination to a remote wireless communication path management system and to a communication device to which the system 130 is operatively coupled. The remote notification may be provided by transmitting information through the wireless transceiver 122 or possibly through another transceiver (not shown), and the local notification may be provided by shutting down the physical network interface 126 or transmitting a notification message through the physical network interface, as described above.

Inputs from different sources, including the wireless transceiver 122, the intermediate data path 124, the physical network interface 126, the user interface 136, and the NMS interface 138, are provided to the wireless communication path control module 132 to make the determination, and possibly to subsequently re-establish the wireless communication path.

Although illustrative examples of shutdown trigger sources have been shown in FIG. 4, the invention is in no way limited to only these sources. Further, fewer, or different sources may be monitored by the wireless communication path monitor 134. In one embodiment, at least the following conditions are monitored:

errors in data received from remote wireless communication equipment within a threshold period of time, possibly with user threshold setting for error and monitor time for both path shutdown and re-establishment determinations;

any hardware and software failures which may necessitate path shutdown or correction of which may allow path re-establishment;

the status of a physical interface or other component which is controlled to shut down the path, if the wireless communication path management system 130 has not itself explicitly shut down the interface;

intentional connect/disconnect requests from a user; and state information received from the remote wireless communication equipment.

If one or more of the triggers provided by sources monitored by the wireless communication path monitor 134 indicates that the path should be shut down, then the wireless communication path control module 132 may shut down the path, illustratively by disconnecting a physical layer component, at the wireless communication equipment at which the system of FIG. 4 is implemented. Re-establishment of the path may be initiated by the wireless communication path control module 132 when none of the triggers indicates path shutdown.

A wireless communication path management system 130 is preferably provided at each end of a wireless communication link. This way, when a path shutdown trigger arrives from any source, from anywhere in the wireless communication path, including a notification from a far end of the path, the path can be shut down or some other action can be taken symmetrically at both ends, allowing network elements to act quickly in symmetric fashion. Similarly, when all the triggers indicate that the path should be re-established, operations may be performed symmetrically at both ends to re-establish the path.

For wireless communication equipment which communicates with multiple installations of remote wireless communication equipment, a single wireless communication path management system 130 may perform management functions for each path. Alternatively, a respective wireless communication path management systems 130 may be provided to manage each wireless communication path.

Further wireless communication path management operations which may also be performed by the wireless communication path management system 130 will be apparent from the foregoing.

Figure 5:
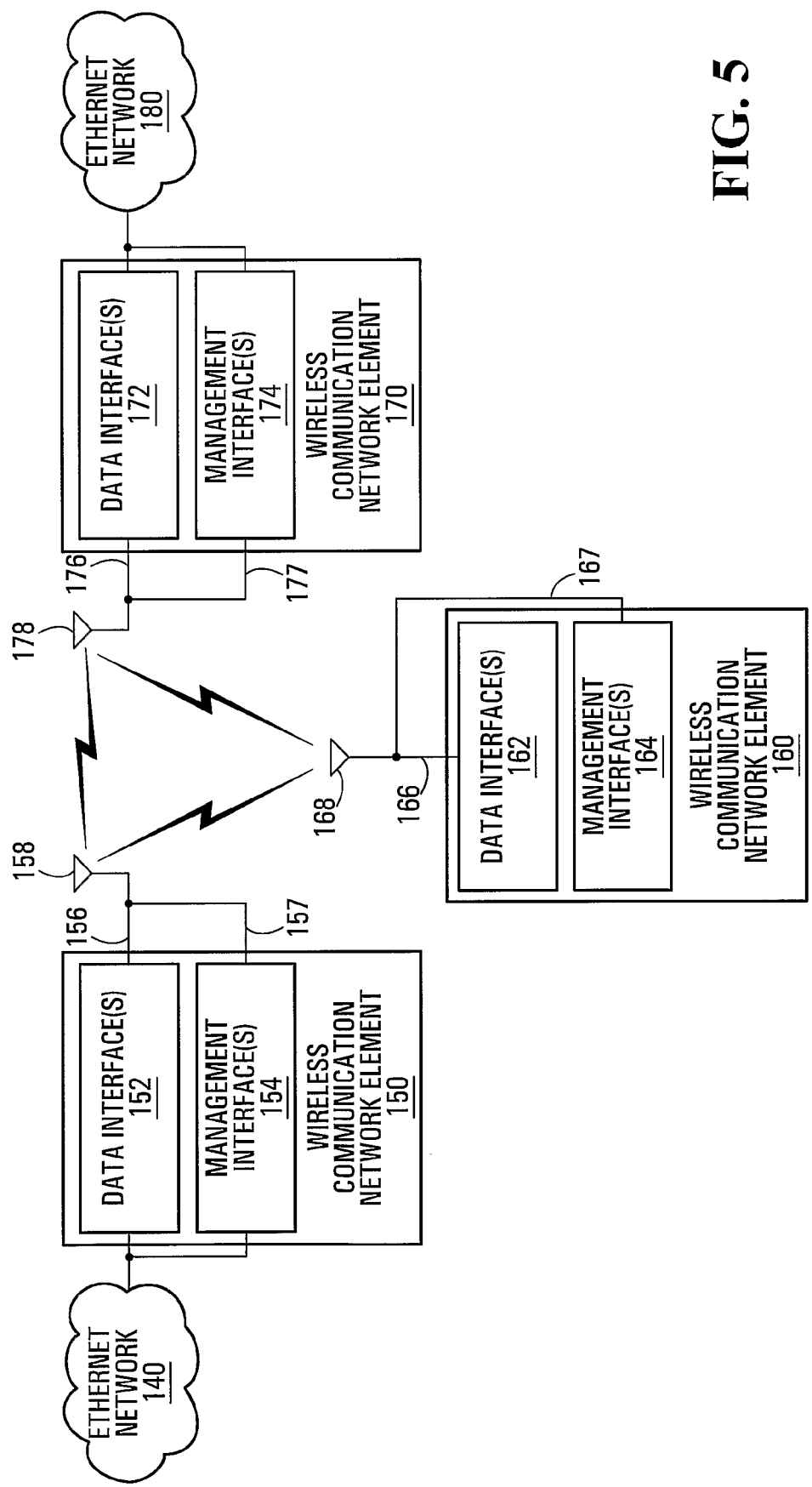
FIG. 5 is a block diagram of an Ethernet mesh/ring network incorporating a network management side channel.

One possible wireless communication path shutdown operation described above involves disabling a physical layer component, illustratively a physical network interface. In this case, a separate control mechanism may be desired to provide for network control after data path shutdown. FIG. 5 is a block diagram of an Ethernet mesh/ring network incorporating such a mechanism in the form of a network management side channel.

The network of FIG. 5 includes wireless communication network elements 150, 160, 170, which represent wireless communication equipment that interconnects communication devices, specifically nodes of the Ethernet networks 140, 180, via wireless communication paths provided by the antennas 158, 168, 178. Each wireless communication network element includes separate data and management interfaces 152/154, 162/164, 172/174, which provide separate data paths 156, 166, 176 and control paths 157, 167, 177. Although each of the network elements 150, 160, 170 might include multiple interfaces or other respective components for transmitting and receiving signals, these have not been separately shown in FIG. 5 so as to avoid overly complicating the drawings. It should also be appreciated that, for illustrative purposes, it has been assumed in FIG. 5 that all of the network elements 150, 160, 170 support bidirectional communications. This might not necessarily be the case in some embodiments, such as in a point-to-multipoint systems.

The control paths 157, 167, 177 are used to transfer information between the wireless communication network elements 150, 160, 170 and an NMS (not shown) for managing the network. The NMS may communicate with the wireless communication network elements 150, 160, 170 through the Ethernet networks 140, 180 as shown, or through some other direct or indirect connection.

Wireless communication path management as described above is preferably implemented at each of the wireless communication network elements 150, 160, 170. The separate management interfaces 154, 164, 174 support one or more side-channels or out-of-band network management channels, which allow management of the network, and specifically the data paths 156, 166, 176, even after the paths have been shut down.

The techniques disclosed herein effectively make a wireless communication path "look like" a wired communication path from the perspective of network elements connected to wireless communication network elements at each end of the path. A wireless communication path shutdown decision made at one end of the path responsive to local monitored conditions is communicated to the other end of the path, to thereby provide for substantially symmetrical detection of wireless communication path problems at both ends of the path. In the absence of such techniques, any inherent resiliency of a network element is dependent upon, for example, an associated protocol's query and responses between adjacent network elements. Thus, although a query and response mechanism may allow a remote wireless communication network element to eventually detect that a wireless communication path has been shut down at an adjacent wireless communication network element, query/response-based detection may require significantly more time than providing a notification as disclosed herein.

In accordance with embodiments of the invention, multiple modes of failure in a wireless communication path (including a radio layer, a physical network layer, a data path therebetween, interconnections and physical interfaces between communication devices and wireless communication equipment at either end of a wireless link) may be detected and presented to the communication devices, illustratively as physical layer failures by way of shutting down physical layer connectivity symmetrically on both ends of the path. Self healing mechanisms inherent in the communication devices can then act very quickly to reconstitute the path in the network.

What has been described is merely illustrative of the application of principles of the invention. Other arrangements and methods can be implemented by those skilled in the art without departing from the scope of the present invention.

For example, it should be appreciated that the invention is in no way limited to the particular systems or methods as illustrated in the drawings. Embodiments of the invention may include further, fewer, or different components and/or operations, which may be performed or interconnected differently than explicitly shown. The specific division of functions between multiple components as shown in the drawings and disclosed herein is similarly illustrative. Thus, the contents of the drawings are intended solely for illustrative purposes, and not to limit the invention.

Many different data structures for tracking states and/or notifications may also be apparent. For example, monitoring and control mechanisms according to embodiments of the invention may employ a concept of "Departures State" and "Arrivals State", each of which can be in an "Up" or "Down" condition.

The Arrivals State, indicative of the ability of wireless communication equipment to accept payload traffic, may represent a summation of the availability of a local wired network at a communication to which the wireless communication equipment is connected, an acceptable error rate in signals received from remote wireless communication equipment, and various status items reflecting the health of a local receiver at the wireless communication equipment. This Arrivals State is preferably sent continuously to the remote wireless communication equipment.

The Departures State represents the likelihood of outgoing payload traffic being correctly received at the remote wireless communication equipment, and may be determined as the summation of the Arrivals State received from the remote wireless communication equipment and various status items reflecting the health of a local transmitter. The wireless communication path including the wireless communication equipment and the remote wireless communication equipment is preferably closed to payload traffic when the Departures State is determined to be "Down".

During shutdown, wireless communication equipment may consider the local wired network to be available, for the purposes of determining the Arrivals State, even though an interface thereto has been disabled as described above. This avoids lockout situations where each end of a wireless communication path is held in shutdown due to unavailability of the wired network at the other end of the path.

Transmission of state information such as the above Arrivals State and Departures State has been described above as part of a remote notification procedure. This type of information, however, may also have local significance. A communication device may wish to determine a state of a wireless communication path to a remote communication device, for example. In some embodiments, a request/response mechanism may be provided to allow a communication device to query connected wireless communication equipment for state information. With reference to FIG. 2 for instance, the network element 60 may request state information for a portion of the wireless communication path, such as the wireless link, or the wireless communication path as a whole, from the wireless communication network element 70 through its interface 62 and the link 64. Other control/message processing functionality may also be provided in communication devices and/or wireless communication equipment. As noted above, for instance, state information could be provided automatically, and not only in response to a query.

In addition, various references have been made above to networks, wireless communication network elements, network elements, and network connections. However, embodiments of the invention may be implemented in conjunction with direct connections or connections which do not necessarily traverse or form a network.

Similarly, embodiments of the invention may be implemented in conjunction with a transmitter for transmitting a notification of a shutdown determination or a receiver for receiving such a notification, even though transceivers have been shown in FIGS. 2 and 4.

It should also be appreciated that the invention need not be provided in a distinct wireless communication network element which is separate from a network element in a wired network, such as an Ethernet network. An Ethernet network element, for example, may be modified to incorporate wireless communication components and the various functions disclosed herein, to support wireless communication path management in a single network element which is capable of communication over both wired and wireless paths. References herein to wireless communication network elements, equipment, and components, and to network elements and communication devices should be interpreted accordingly, as relating to either separate wired and wireless communication devices or parts of the same communication device.

Furthermore, although described primarily in the context of methods and systems, other implementations of the invention are also contemplated, as instructions stored on a machine-readable medium for example.

We claim:

1. A method of managing a wireless communication path, the method comprising:
monitoring, at wireless communication equipment operatively coupled to a communication device, a wireless communication path established between the communication device and a remote communication device through the wireless communication equipment;
determining whether the wireless communication path should be shut down based on results of the monitoring; and
providing a respective notification to each of the communication devices where the wireless communication path should be shut down,
wherein determining comprises determining that the wireless communication path should be shut down where an Arrivals State received from the remote wireless communication network element indicates that receiving functions at the remote wireless communication network element are not in a normal operating state.

2. The method of claim 1, wherein providing comprises at least one of:
transmitting to the remote communication device state information associated with at least one of: the wireless communication path, the wireless communication equipment, and the communication device;
providing a notification to the remote communication device by transmitting a wireless communication path shutdown command to the remote communication device;
providing a notification to the remote communication device by transmitting information to the remote communication device via at least a portion of the wireless communication path;
providing a notification to the communication device by shutting down the wireless communication path at the wireless communication equipment;
providing a notification to the remote communication device by transmitting information to the remote communication device after shutting down the wireless communication path;
transmitting information to the remote communication device via an alternate communication path; and
transmitting a notification message to the communication device.

3. The method of claim 2, wherein the state information comprises a Departures State representing the likelihood of communication traffic being correctly received at the remote wireless communication equipment.

4. The method of claim 1, further comprising, where the wireless communication path should not be shut down:
periodically transmitting to the remote wireless communication equipment state information associated with at least one of: the wireless communication path, the wireless communication equipment, and the communication device.

5. The method of claim 4, wherein the state information comprises an Arrivals State indicating an operating status of receiving functions at the wireless communication equipment.

6. The method of claim 1, wherein providing a notification to the communication device comprises shutting down the wireless communication at the wireless communication equipment, and wherein the method further comprises, after shutting down the wireless communication path:
monitoring, at the wireless communication equipment, at least one of the wireless communication path and one or more components associated with the wireless communication path;
determining whether the wireless communication path should be re-established; and
re-establishing the wireless communication path at the wireless communication equipment where the wireless communication path should be re-established.

7. The method of claim 6, wherein monitoring the wireless communication path before and after shutdown comprise monitoring common conditions associated with the wireless communication path.

8. The method of claim 7, wherein determining whether the wireless communication path should be shut down and determining whether the wireless communication path should be re-established comprise applying respective different criteria to the common conditions.

9. The method of claim 6, wherein determining whether the wireless communication path should be re-established comprises determining whether a command to re-establish the wireless communication path has been received at the wireless communication equipment or at the remote wireless communication equipment.

10. The method of claim 1, further comprising:
receiving a notification from the wireless communication equipment at the remote wireless communication equipment; and
shutting down the wireless communication path at the remote wireless communication equipment responsive to the received notification.

11. The method of claim 1, further comprising:
monitoring the wireless communication path at the remote wireless communication equipment;
determining, at the remote wireless communication equipment, whether the wireless communication path should be shut down based on results of the monitoring; and
providing a respective notification from the remote wireless communication equipment to each of the communication devices where it is determined at the remote wireless communication equipment that the wireless communication path should be shut down.

12. A non-transitory computer-readable medium storing instructions which when executed perform the method of claim 1.

13. The method of claim 1, wherein determining comprises determining that the wireless communication path should be shut down where an error rate of communication signals received from the remote wireless communication equipment within a predetermined period of time exceeds a threshold error rate.

14. The method of claim 1, wherein determining comprises determining that the wireless communication path should be shut down where the monitoring detects a hardware failure at the wireless communication equipment or a network element to which the wireless communication equipment is connected.

15. The method of claim 1, wherein determining comprises determining that the wireless communication path should be shut down where the monitoring detects a software failure at the wireless communication equipment or a network element to which the wireless communication equipment is connected.

16. The method of claim 1, wherein determining comprises determining that the wireless communication path should be shut down where a user input requesting that the wireless communication path be shut down is received.

17. A system for managing a wireless communication path, the system comprising:
a wireless communication path monitor configured to monitor at wireless communication equipment operatively coupled to a communication device a wireless communication path established between the communication device and a remote communication device through the wireless communication equipment; and
a wireless communication path control module operatively coupled to the wireless communication path monitor and configured to determine based on monitoring results whether the wireless communication path should be shut down, and to provide a respective notification to each of the communication devices where the wireless communication path should be shut down,
wherein the wireless communication path control module is configured to determine that the wireless communication path should be shut down where an Arrivals State received from remote wireless communication equipment operatively coupled to the remote communication device indicates that receiving functions at the remote wireless communication equipment are not in a normal operating state.

18. The system of claim 17, wherein the wireless communication equipment comprises a transmitter for transmitting communication signals to the remote wireless communication equipment, and wherein the wireless communication path control module provides a notification to the remote communication device by transmitting through the transmitter a wireless communication path shutdown command or state information associated with at least one of the wireless communication path, the wireless communication equipment, and the communication device.

19. The system of claim 18, wherein the state information comprises a Departures State representing the likelihood of communication traffic being correctly received at the remote wireless communication equipment.

20. The system of claim 17, wherein the wireless communication equipment comprises a transmitter for enabling communication, via an alternate communication path, with the remote wireless communication equipment, and wherein the wireless communication path control module is configured to provide a notification to the remote communication device by transmitting information to the remote wireless communication equipment through the transmitter.

21. The system of claim 17, wherein the wireless communication equipment comprises a transmitter for transmitting communication signals to the remote wireless communication equipment, and wherein the wireless communication path control module is further configured to periodically transmit to the remote wireless communication equipment through the transmitter state information associated with at least one of the wireless communication path, the wireless communication equipment, and the communication device where the wireless communication path should not be shut down.

22. The system of claim 21, wherein the state information comprises an Arrivals State indicating an operating status of receiving functions at the wireless communication equipment.

23. The system of claim 17, wherein the wireless communication path control module is configured to provide a notification to the communication device by one or more of: transmitting a notification message to the communication device, and shutting down the wireless communication path at the wireless communication equipment.

24. The system of claim 17, wherein the wireless communication path control module is configured to provide a notification to the communication device by shutting down the wireless communication path at the wireless communication equipment, wherein the wireless communication path monitor is further configured to monitor, after the wireless communication path is shut down, at least one of the wireless communication path and one or more components at the wireless communication equipment which are associated with the wireless communication path, and wherein the wireless communication path control module is further configured to determine whether the wireless communication path should be re-established and to re-establish the wireless communication path at the wireless communication equipment where the wireless communication path should be re-established.

25. The system of claim 24, wherein the wireless communication path control module is configured to determine whether the wireless communication path should be shut down and to determine whether the wireless communication path should be re-established based on common monitored conditions of the wireless communication path and the one or more components associated with the wireless communication path.

26. The system of claim 25, wherein the wireless communication path control module is configured to apply respective different criteria to the common conditions to determine whether the wireless communication path should be shut down and to determine whether the wireless communication path should be re-established.

27. The system of claim 17, wherein the wireless communication equipment comprises a receiver for receiving communication signals from the remote wireless communication equipment, wherein the wireless communication path control module is configured to determine that the wireless communication path should be shut down at the wireless communication equipment where a notification that the wireless communication path should be shut down is received from the remote wireless communication equipment.

28. A network comprising:
a network element operatively coupled to a wireless communication network element incorporating the system of claim 17; and
a remote network element operatively coupled to a remote wireless communication network element, the remote wireless communication network element comprising:
a receiver for receiving a notification from the wireless communication network element; and
a wireless communication path control module configured to provide a path shutdown notification to the remote network element responsive to the received notification.

29. A network comprising:
a plurality of network elements connected to respective wireless communication network elements incorporating the system of claim 17, the wireless communication network elements comprising respective wireless communication paths between the network elements,
wherein the wireless communication path control module at each wireless communication network element comprising a wireless communication path is configured to provide a path shutdown notification to its associated network element responsive to either its own determination that the wireless communication path should be shut down or a notification from the other wireless communication network element comprising the wireless communication path.

30. A method of managing a wireless communication path, the method comprising:
receiving at wireless communication equipment operatively coupled to a communication device a notification that a determination has been made at remote wireless communication equipment operatively coupled to a remote communication device that a wireless communication path between the communication devices should be shut down; and
providing a path shutdown notification to the communication device responsive to the received notification,
wherein providing a path shutdown notification comprises shutting down the wireless communication path at the wireless communication equipment, and wherein the method further comprises:
shutting down the wireless communication path at the remote wireless communication equipment.

31. The method of claim 30, wherein the received notification comprises at least one of:
state information associated with at least one of: the wireless communication path, the remote wireless communication equipment, and the remote communication device; and
a wireless communication path shutdown command.

32. The method of claim 31, wherein the state information comprises a Departures State representing the likelihood of communication traffic being correctly received at the wireless communication equipment.

33. The method of claim 30, wherein receiving comprises receiving the notification via at least a portion of the wireless communication path.

34. The method of claim 30, wherein the method further comprises, after shutting down the wireless communication path:
monitoring, at the wireless communication equipment, at least one of the wireless communication path and one or more components associated with the wireless communication path;
determining whether the wireless communication path should be re-established; and
re-establishing the wireless communication path at the wireless communication equipment where the wireless communication path should be re-established.

35. A non-transitory computer-readable medium storing instructions which when executed perform the method of claim 30.

36. A system for managing a wireless communication path, the system comprising:
a wireless communication path monitor configured to receive at wireless communication equipment operatively coupled to a communication device a notification that a determination has been made at remote wireless communication equipment operatively coupled to a remote communication device that a wireless communication path between the communication devices should be shut down; and
a wireless communication path control module operatively coupled to the wireless communication path monitor and configured to provide a path shutdown notification to the communication device responsive to the received notification,
wherein the wireless communication equipment comprises a transmitter for enabling communication, via an alternate communication path, with the remote wireless communication equipment, and wherein the wireless communication path control module is configured to provide a notification to the remote communication device by transmitting information to the remote wireless communication equipment through the transmitter.

37. The system of claim 36, wherein the received notification comprises a wireless communication path shutdown command or state information associated with at least one of the wireless communication path, the remote wireless communication equipment, and the remote communication device.

38. The system of claim 37, wherein the state information comprises a Departures State representing the likelihood of communication traffic being correctly received at the wireless communication equipment.

39. The system of claim 36, wherein the wireless communication path control module is configured to provide the shutdown notification to the communication device by shutting down the wireless communication path at the wireless communication equipment, and wherein the wireless communication path monitor is further configured to monitor, after shutting down the wireless communication path, at least one of the wireless communication path and one or more components at the wireless communication equipment which are associated with the wireless communication path, and wherein the wireless communication path control module is further configured to determine whether the wireless communication path should be re-established and to re-establish the wireless communication path at the wireless communication equipment where the wireless communication path should be re-established.

40. A network comprising:
a network element connected to a wireless communication network element incorporating the system of claim 36; and
a remote network element connected to a remote wireless communication network element, the remote wireless communication network element comprising:
a wireless communication path control module configured to send the notification to the wireless communication network element.

41. A network comprising:
a plurality of network elements connected to respective wireless communication network elements incorporating the system of claim 36, the wireless communication network elements comprising respective wireless communication paths between the network elements,
wherein the wireless communication path control module at each wireless communication network element comprising a wireless communication path is configured to provide a path shutdown notification to its associated network element responsive to either its own determination that the wireless communication path should be shut down or a notification from the other wireless communication network element comprising the wireless communication path.

42. In a communication system in which communication networks are interconnected by wireless communication paths comprising respective wireless communication network elements connected to network elements of the communication networks, a method of managing the wireless communication paths comprising:
monitoring, at each wireless communication network element, each wireless communication path via which the wireless communication network element communicates with a respective adjacent wireless communication network element, to detect any of multiple modes of failure in each wireless communication path; and
presenting any modes of failure detected by a wireless communication network element for a wireless communication path to the network element to which the wireless communication network element is connected as a physical layer failure,
wherein presenting any detected modes of failure as a physical layer failure comprises shutting down the wireless communication path,
wherein the method further comprises:
monitoring common conditions associated with the wireless communication path before and after shutdown.

* * * * *

UNITED STATES PATENT AND TRADEMARK OFFICE
CERTIFICATE OF CORRECTION

PATENT NO. : 8,606,186 B2
APPLICATION NO. : 11/793680
DATED : December 10, 2013
INVENTOR(S) : Prakasha Aithal et al.

Page 1 of 1

It is certified that error appears in the above-identified patent and that said Letters Patent is hereby corrected as shown below:

In the Claims

Claim 1, Column 20, Lines 6 to 7: replace "the remote wireless communication network element" with -- remote wireless communication equipment operatively coupled to the remote communication device --

Claim 1, Column 20, Lines 8 to 9: replace "the remote wireless communication network element" with -- the remote wireless communication equipment --

Claim 6, Column 20, Line 52: insert -- path -- before "at the"

Signed and Sealed this
Twenty-fifth Day of April, 2017

Michelle K. Lee
*Director of the United States Patent and Trademark Office*